Nov. 24, 1931.  J. B. MENTON  1,833,584
MEANS FOR SECURING FOOT MATS ON RUNNING BOARDS OF AUTOMOTIVE VEHICLES
Filed Aug. 26, 1929  2 Sheets-Sheet 1
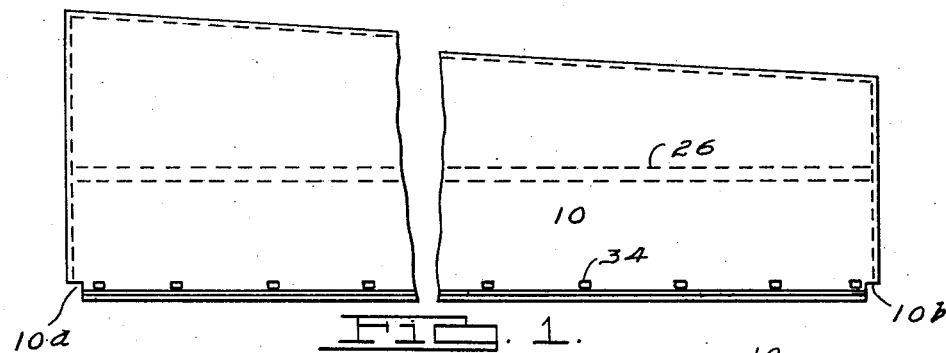
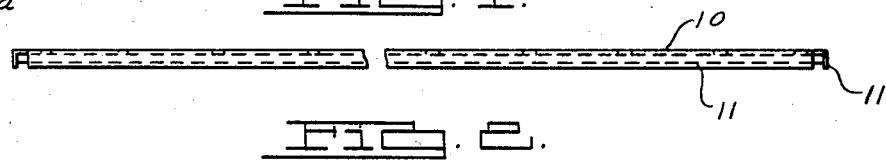
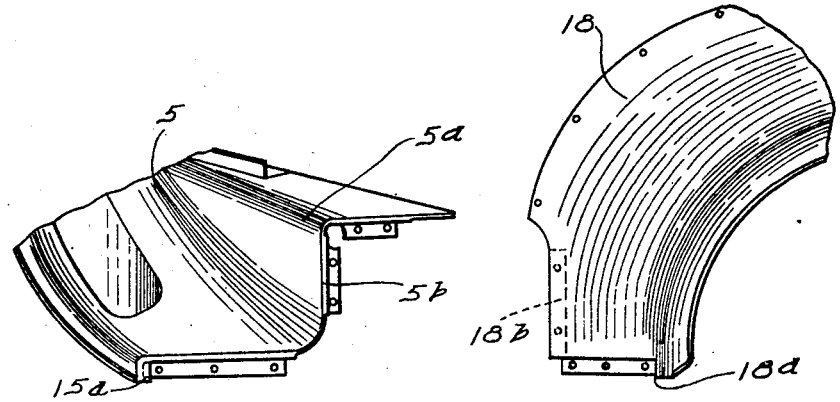
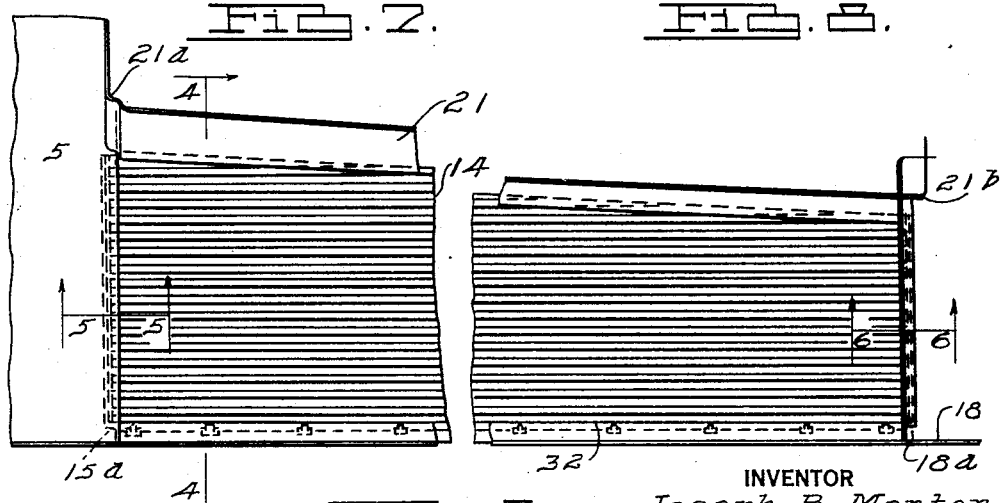
INVENTOR
Joseph B. Menton.
BY
ATTORNEY Nov. 24, 1931.  J. B. MENTON  1,833,584
MEANS FOR SECURING FOOT MATS ON RUNNING BOARDS OF AUTOMOTIVE VEHICLES
Filed Aug. 26, 1929  2 Sheets-Sheet 2
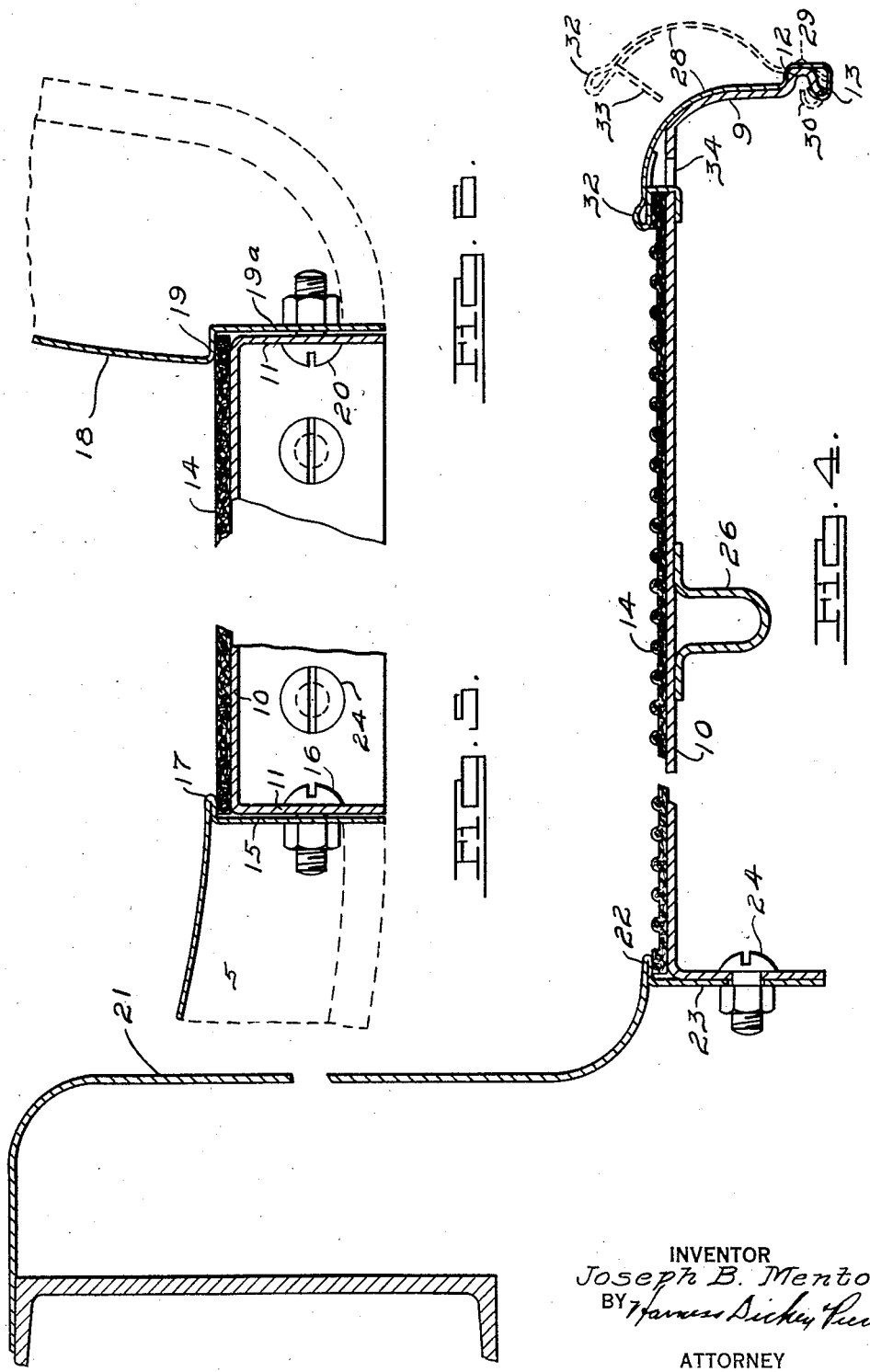
INVENTOR
Joseph B. Menton.
BY Harness Dickey Pierce
ATTORNEY Patented Nov. 24, 1931

1,833,584

UNITED STATES PATENT OFFICE

JOSEPH B. MENTON, OF DETROIT, MICHIGAN, ASSIGNOR TO THE MURRAY CORPORATION OF AMERICA, A CORPORATION OF DELAWARE

MEANS FOR SECURING FOOT MATS ON RUNNING BOARDS OF AUTOMOTIVE VEHICLES

Application filed August 26, 1929. Serial No. 388,290.

This invention embodies a novel fender and splash panel construction and a novel molding or retaining strip for securing a foot mat upon the running board of an automobile.

One object of the invention is to provide a novel form of molding for securing the edge of a foot mat to a running board.

Another object of the invention is to provide a novel form of molding of the type mentioned which may be readily shaped to conform to the trim scheme of the vehicle.

Another object of the invention is to provide a novel fender and splash panel construction including integral horizontal flanges in a common plane and so spaced from the edges of the running board as to be particularly adapted to secure the edge of a foot mat to a running board and thereby to obviate use of molding or retaining strips.

With these and other objects in view, my invention consists in the arrangement, combination and construction of the various parts of my improved device, as described in the specification, claimed in my claims, and shown in the accompanying drawings, in which:

Fig. 1 is a plan view of the running board.

Fig. 2 is a side elevation of the running board.

Fig. 3 is a fragmentary plan view showing the running board, fenders, splash panel, and foot mat assembled.

Fig. 4 is an enlarged section taken on the line 4—4 of Fig. 3.

Fig. 5 is an enlarged section taken on the line 5—5 of Fig. 3.

Fig. 6 is an enlarged section taken on the line 6—6 of Fig. 3.

Fig. 7 is a fragmentary perspective view of my front fender.

Fig. 8 is a fragmentary perspective view of my rear fender.

It is customary and conventional practice to secure mats on running boards by means of separate molding or retaining strips which are applied to all four borders of the mat and which are usually secured to the running board by nails or screws. In many such cases additional strips are used to conceal the nails or other fastening means. I have provided a much simpler and cheaper means for securing such a mat to a running board which comprises the formation of special clamping flanges on the front and rear fenders and the splash panel and a single separate molding or retaining strip of novel construction for the outer edge of the running board, and which eliminates entirely the use of screws or nails.

As illustrative of the present invention I have shown in the drawings a running board 10 comprising a flat metal plate having downturned marginal flanges 11. The outer edge flange of the running board is slightly rounded as shown in Fig. 4 and in the lower edge is formed a channel 12 having a downwardly extending lip 13.

The rear end of the front fender 5 is adapted to be joined to the end of the running board 10 and the splash panel 21 and is formed as shown in Fig. 5 with the edge portion bent back upon itself and then downwardly to form the lip or horizontal flange 17 and the depending flange 15. The flange 15 is secured to the flange 11 of the running board 10 by the bolts 16. The lip 17 extends over the edge of the running board 10 and is adapted to cover and clamp the edge of the foot mat 14 to the top of the running board.

The lower edge of the rear fender is offset rearwardly and downwardly and to form a lateral shoulder or horizontal flange 19 and a depending flange 19a as shown in Fig. 6. The lateral shoulder 19 extends over the rear edge of the running board and is adapted to clamp the rear edge of the foot mat thereto and the flange 19a is secured to the rear flange 11 of the running board by bolts 20.

It will be noted that the outer corners of the running board 10 are notched as indicated at 10a and 10b in Figs. 1 and 2, and as shown in Figs. 7 and 8 the overlapping flanges 17 and 19 of the front and rear fenders respectively are not carried to the extreme lower outer corners of the fenders. Thus a shouldered portion 15a is provided on the outer corner of the fender 5 which fits in the notch 10a on the forward outer corner of the running board and a shouldered portion 18a is provided on the outer corner of the fender 18 which fits the notch 10b in the rear outer corner of the running board. These shouldered portions 15a and 18a form abutments for the ends of a molding strip which is applied to the outer edge of the running board as hereinafter described.

The splash panel which covers the space between the lower edge of the vehicle body and the inner edge of the running board is designated by the numeral 21. As shown in Fig. 4, the lower portion of the splash panel is bent back upon itself to form a lip or horizontal flange 22 and then downwardly to form a depending flange 23. The lip 22 extends over the inner edge of the running board in the same plane with flanges 17 and 19 and clamps the inner edge of the mat 14 thereto, and the flange 23 lies against the inner flange of the running board and is secured thereto by bolts 24. As shown in Fig. 3, the forward edge of the splash panel 21 has a shouldered flange 21a formed thereon adapted to fit the lipped flange 5b on rear inner portion 5a of the front fender 5 and form a flush joint therewith. The rear vertical edge 21b (Fig. 3) of the splash panel 21 may be joined by bolts or other suitable means to a rearwardly turned flange 18b formed on the lower inner edge of the rear fender 18. The general front fender construction and the fender, splash panel and running board assembly are the subject of my copending application Ser. No. 388,291.

As shown in Fig. 4, a molding strip 28 of novel construction is provided for the outer flange 9 of the running board 10 for securing the outer edge of the mat 14. The molding 28 is of arcuate shape and has an offset channeled portion 29, the lower edge of which engages the channel 12 on the lower edge of the running board flange 9. The edge of the outer side of the channel 29 is bent inwardly to form a lip 30 which is adapted to engage the lip 13 of the channel 12. The upper edge of the molding 28 is return bent, forming a bead portion 32 on the upper edge of the molding. Tongues 33 are struck out of the return bent portion adjacent its edge and are bent away from the body of the molding and inserted through apertures 34 formed in the edge of the running board, and then bent up against the under side of the running board to secure the molding to the running board and also to clamp the beaded edge 32 firmly against the outer edge of the foot mat 14. The molding 28 is assembled to the running board by first engaging the lip 30 over the running board channel lip 13 and then forcing the body portion inwardly to bring the beaded portion 32 over and against the edge of the foot mat 14 and the tongues through the apertures 34, and the ends of the tongues are then bent over against the under side of the running board to firmly clamp the molding in place. The molding 28 extends the full length of the outer edge of the running board and its ends abut against the corners 15a and 18a of the front and rear fenders. This molding may be shaped to conform to the general contour of the outer edges of the fenders, which improves the finished appearance of the car. It will be apparent that the construction makes possible the elimination of all nails or screws for securing the molding or foot mat to the running board and also the elimination of separate molding or binding strips for three sides of the foot mat. All separate fastener concealing strips are also eliminated.

Formal changes may be made in the specific embodiment of the invention described without departing from the spirit and substance of the broad invention, the scope of which is commensurate with the appended claims.

What I claim is:

1. In combination with a running board, a front fender, a rear fender, and a running board splash guard all having means to which said running board may be secured and having lateral, integral and substantially horizontal flanges formed therein in a common plane adjacent to but vertically spaced from the edges of said running board and adapted to overlie the marginal portions of said running board and clamp the edge of a foot mat thereto.

2. In combination with a running board, a front fender, a rear fender, and a running board splash guard each having dependent flanges to which said running board may be secured, and having integral and substantially horizontal flanges formed therein in a common plane, adjacent said dependent flanges and positioned to overlie the marginal portions of said running board and clamp the edge of a foot mat thereto.

3. In combination with a running board having notched outer corners, a molding strip secured to the outer edge thereof extending the full length thereof between said notches and adapted to secure the margin of a foot mat thereto, a front fender having its rear outer corner formed to fill the notch in the forward outer corner of said running board and abut the end of said molding strip, and having the rear edge portion inwardly of said outer corner return and downwardly bent to form an attaching flange for said running board and a rearwardly extending lip adapted to overlie the forward top margin of said running board and secure the margin of said foot mat thereto, a rear fender having its outer forward corner formed to fill the notch in the rear outer corner of said running board and abut the end of said molding strip, and having its forward edge portion inwardly of said outer corner bent rearwardly and downwardly to form an attaching flange for said running board and a shouldered portion adapted to overlie the rear top margin of said running board and secure the margin of said foot mat thereto, and a splash panel extending along the inner edge of running board and having its lower edge portion return and downwardly bent to form an attaching flange for said running board and an outwardly extending lip portion adapted to overlie the inner top margin of said running board and secure the margin of a foot mat thereto.

4. In combination a running board having a depending flange along its outer edge, a series of apertures in its outer marginal portion adjacent said flange, an inwardly facing channel formed in the lower edge of said flange, and an edge molding piece comprising an elongated arcuately shaped strip having one edge portion bent to form a hook adapted to engage the channeled edge of said running board flange, and having its other edge portion return bent to form a marginal bead adapted to overlie the outer top margin of said running board, and having tongues struck out of said return bent portion and spaced to register with the apertures in the margin of said running board and adapted to be bent over against the under side of said running board and thereby secure said molding strip thereto.

5. In combination with a running board having a depending flange along its outer edge, a series of apertures in its outer marginal portion adjacent said flange, and an inwardly facing channel formed in the lower edge of said flange, and an edge molding piece having one edge portion formed to hook into the channeled edge of said running board flange, and having its other edge return bent and adapted to overlie the outer top margin of said running board, and having tongues struck out of said return bent portion and spaced to register with the marginal apertures in said running board and adapted to be bent up against the under side thereof for securing said molding strip thereto.

6. In combination with a running board having a depending flange along its outer edge, and a series of spaced apertures in its outer marginal portion adjacent said flange, and an edge molding strip having one edge formed to hook upon the lower edge of said running board flange and its other edge return bent and adapted to overlie the outer top margin of said running board, and having tongues struck out of said return bent portion and spaced to register with the marginal apertures in said running board and adapted to be bent up against the under side thereof for securing said molding strip thereto.

JOSEPH B. MENTON.